Dec. 29, 1942.  W. L. BENNINGHOFF  2,306,798
CUTTING TOOL
Filed April 21, 1941
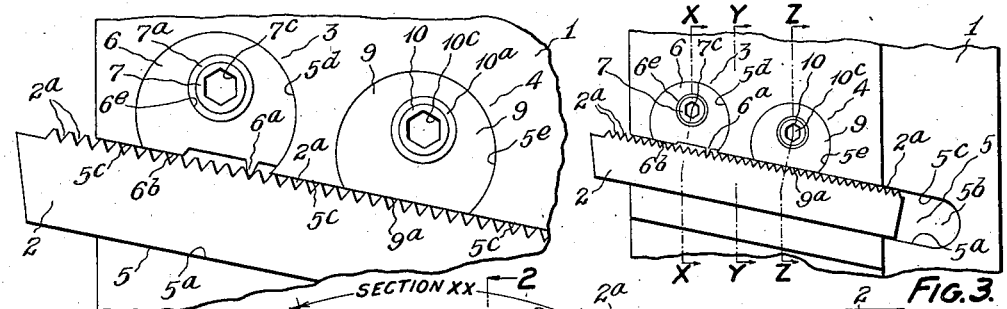
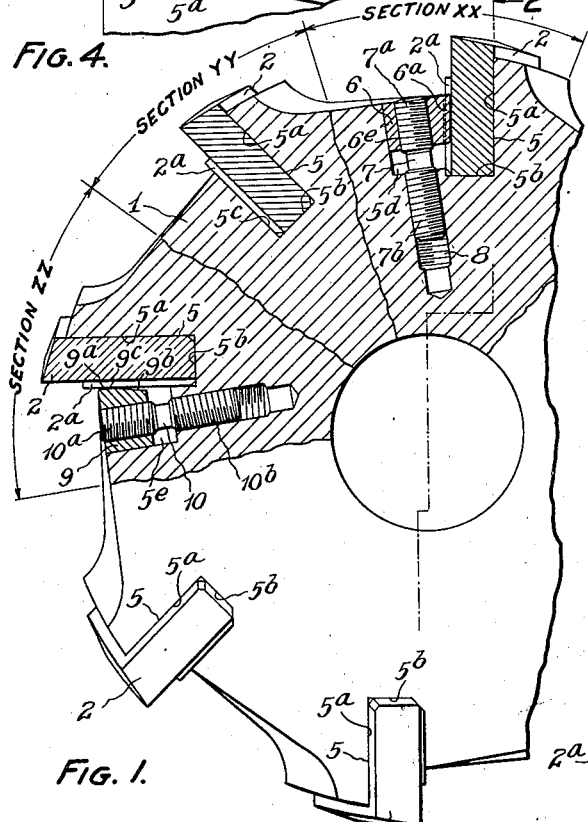
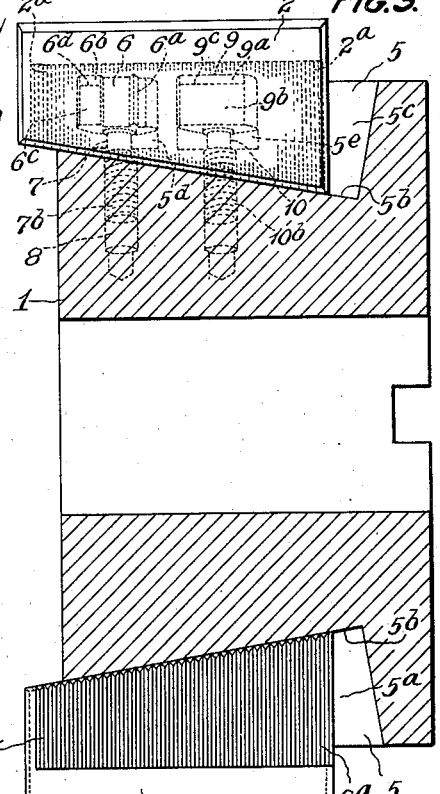
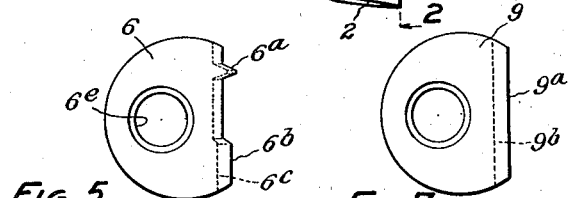
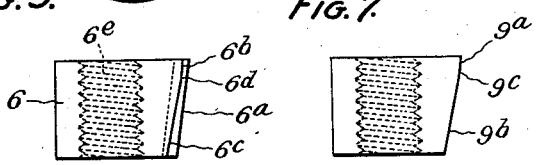
INVENTOR:
Wm. L. Benninghoff
BY Ray A. Gehr
ATTORNEY Patented Dec. 29, 1942

2,306,798

UNITED STATES PATENT OFFICE 2,306,798

CUTTING TOOL

William L. Benninghoff, Shaker Heights, Ohio

Application April 21, 1941, Serial No. 389,560

9 Claims. (Cl. 29—105)

This invention relates to metal-cutting tools such for example, as milling tools, boring tools, reamers and threading dies, of the type having a body structure and inserted cutting blades or teeth.

The object of the invention, generally speaking, is to provide improved means for detachably securing the individual cutters to the tool body.

More specifically, it is an object of the invention to provide a tool having clamping means for the cutter blade that is easily operated to secure and release the blade, that operates uniformly and reliably to secure the blade rigidly to the tool body, that permits adjustment of the blade in relation to the tool body and that is so constructed as to facilitate manufacture of the parts with the requisite degree of accuracy.

A further object of the invention is the provision of a clamping device for the cutter element including a wedge member in which the wedge has adequate strength notwithstanding concentration of the clamping pressure in a relatively small zone of the wedge With the foregoing objects in view the invention consists in certain forms and combinations of parts set forth in the following description in which, for purposes of illustration and explanation, but not limitation, the invention is disclosed as embodied in a specific tool adapted to serve either as an end mill or as a boring tool, the description having reference to the accompanying drawing.

In the drawing, Fig. 1 is a fragmentary front (or side) elevation of the tool with three different parts of the structure shown in sections designated X—X, Y—Y and Z—Z, the positions on which these sections are taken being indicated by the lines X—X, Y—Y and Z—Z, respectively, of Fig. 3.

Fig. 2 is an axial section on the line 2—2 of Fig. 1.

Fig. 3 is a fragmentary plan view of a portion of the tool.

Fig. 4 is an enlargement of the plan shown in Fig. 3.

Figs. 5 and 6 are, respectively, a plan and side elevation of a clamping wedge and Figs. 7 and 8 are, respectively, a plan and side elevation of another form of clamping wedge.

Referring in detail to the construction illustrated, 1 designates a tool body adapted to be mounted upon a driving shaft in well known manner. 2, 2 are a series of cutter blades carried by the tool body and 3, 4 designate as entireties clamping means for operatively securing the cutters in position.

To receive the cutter blades the tool body is formed with a series of peripheral channels 5, each of which has a plane rear wall 5$^a$ and inner side wall 5$^b$ and a front wall 5$^c$. The inner wall 5$^b$, in the particular construction shown, is inclined to the axis of the tool as shown in Fig. 2.

Each of the cutters 2 is made of a thickness to slip easily into its channel 5 and has its inner side inclined to its outer side so as to conform to the inclined inner side wall 5$^b$ of the tool body. The rear face of the cutter blade is plane to fit the plane wall 5$^a$ of channel 5 and the front face of the cutter is formed with a series of parallel grooves 2$^a$ of uniform width and depth throughout their lengths. The forward and outer sides of each cutter are formed with suitable cutting clearance or relief as shown.

The cutter clamping devices designated as an entirety by the numeral 3 comprise a wedge block 6 which is disposed in a recess 5$^d$ in the front wall of the channel 5. In the preferred construction shown the recess 5$^d$ and the wedge 6 are made cylindrical in form to facilitate manufacture. The cylindrical form of the recess intersects the channel as plainly appears in Figs. 3 and 4 and the rear side of the wedge 6 is cut away to accommodate the cutter blade. On the rear side of wedge 6 is formed a single tooth 6$^a$ preferably having its sides parallel to its axis and designed to engage any one of the grooves 2$^a$ of the cutter blade. The tooth 6$^a$ is preferably formed, as best shown in Fig. 4, so as to engage the sides of the grooves 2$^a$ near the bottoms thereof. The wedge block 6 is also formed on its rear side with an inclined surface 6$^b$ of relatively small depth and with a somewhat more greatly inclined surface 6$^c$ below the surface 6$^b$. These surfaces are spaced laterally away from the tooth 6$^a$ and at the intersection of these two plane surfaces 6$^b$ and 6$^c$ there is formed a line contact zone 6$^d$ adapted to engage the grooved front face of the cutter blade.

The clamping means 3 further comprise a screw 7 which is formed at one end with left hand thread 7$^a$ and at its other end with right hand thread 7$^b$. The thread 7$^b$ engages a corresponding thread in a hole 8 drilled and tapped in the bottom of recess 5$^d$ while the thread 7$^a$ engages a corresponding thread in a hole 6$^e$ of the wedge 6. The screw 7 and the hole 6$^e$ of wedge 6 are parallel to the axis of the cylindrical wedge 6. When the wedge 6 is large enough to permit it, the screw is made concentric with the wedge but in the size of tool shown it is made eccentric to avoid interference with the blade 2. The screw 7 has an hexagonal wrench socket $7^c$ sunk in the exposed end thereof and by rotating the screw in a clockwise direction the wedge 6 is drawn into the tool body so as to effectively clamp the adjacent cutter blade 2 against the walls $5^a$ and $5^b$ of its channel. When it is desired to release the cutter blade the screw 7 is rotated in a counterclockwise direction and this rotation forces the wedge 6 positively upward to loosen the wedge and free the blade. The use of the two opposed threads $7^a$ and $7^b$ has the further advantage of actuating the wedge rapidly for a given rotational movement of the screw.

Referring further to the clamping action of the wedge 6, it will be observed that the tooth $6^a$ and the line contact zone $6^d$ are disposed on opposite sides of an axial plane of the wedge 6 normal to the cutter blade. Consequently when screw 7 is rotated to tighten the wedge, if the tooth $6^a$ and the contact zone $6^d$ because of inaccuracies or irregularities in the form of either of the cooperating parts fail to engage simultaneously with the cutter blade, the wedge is permitted to turn on its axis slightly so that firm contact of the tooth $6^a$ and contact zone $6^d$ with the front of the cutter blade is established with the tooth $6^a$ firmly engaging the sides of one of the grooves of the cutter blade. The rotational movement of the wedge referred to is permitted even when the screw 7 is eccentrically arranged because of the small normal clearances between the threads of screw 7 and the threaded parts with which they cooperate.

When once the wedge has been tightened, there is no tendency for the cooperating wedge and blade parts to change position in relation to each other and the cutter blade is held securely and accurately in position. This result, which is dependent upon the use of the single tooth $6^a$ of the wedge, is secured without the necessity of forming the cooperating wedge and cutter blade surfaces with high accuracy. For example, the grooves in the front face of the cutter blade may satisfactorily be formed by ordinary machining operations because any small or moderate inaccuracies in the form or spacing of the grooves is without significance since only one groove is engaged at any one time by the single tooth of the clamping wedge. This is in contrast with certain prior practices in which the clamping wedge is formed with a series of teeth which simultaneously engage grooves in the face of the cutter blade. In such prior constructions it has been necessary to form both the grooves of the blade and the teeth of the wedge with a high degree of accuracy, as to form and spacing of the grooves and teeth, since otherwise a part only of the teeth and grooves may come into effective engagement and such limited engagement may occur between the teeth of the wedge so disposed in relation to the axis thereof that slight rotation of the wedge may occur under the stresses and vibration of tool operation with resultant loosening of the blade, notwithstanding the fact that the clamp was apparently effectively tightened when the blade was initially set in the tool body. Furthermore, in such prior constructions if the cutter blade grooves and the wedge teeth are not formed and spaced with requisite accuracy severe stresses may be set up in the metal between the few points of contact established of such a nature as to subject the parts to undue strain resulting sometimes in fracture during tool operation.

In accordance with the present invention, as the clamp is tightened the single wedge tooth settles firmly and easily into proper locking contact with a cutter blade groove without setting up any undesirable stresses because, with the single tooth engagement and the surface engagement at the contact zone $6^d$ of the clamping wedge, the cutter blade is free to move endwise slightly, as the clamp begins to tighten, to accommodate itself to the position of the wedge tooth and no undue stresses are set up in either the wedge or the cutter blade.

By disposing the line contact zone $6^d$ in a position removed from both the top and the bottom of the wedge block 6 the stress which is set up in the metal of the wedge in the very restricted area is more widely distributed in the metal than it would be if the zone of contact were disposed at the top surface of the block and likelihood of fracture of the block is thus reduced.

When the invention is to be applied to a tool using short cutter teeth or blades, a single clamping wedge, such as the wedge 6, will amply suffice to secure it in position; but for tools employing longer cutter blades, such as that illustrated in the drawing, it is better to employ more than one clamp. Thus I have provided the tool illustrated with an additional clamping wedge 9 which is disposed in a recess $5^e$ in the front wall of the channel 5. The wedge 9 is cylindrical in form to fit the cylindrical recess $5^e$ and is provided with a screw 10 having left hand and right hand threads $10^a$ and $10^b$, engaging the clamp 9 and the tool body 1, respectively, the exposed end of the screw 10 being formed with a wrench socket $10^c$. The wedge 9 might be formed throughout like the wedge 6 but I prefer to form it without a tooth corresponding to the tooth $6^a$ of wedge 6. Thus, as shown in Figs. 7 and 8, the wedge 9 has its rear side cut away and formed with plane surfaces $9^a$ and $9^b$ which intersect to form a line contact zone $9^c$ to engage the front face of cutter 1. This restricted contact zone, as in the case of the contact zone $6^d$ of clamp 6, tends to insure an effective uniform clamping action on the cutter blade without the necessity of any precise positioning of the wedge 9 in relation to the blade. Also by disposing the contact zone $9^c$ more or less remote from the top and bottom edges of the wedge the latter is well adapted to sustain the compressive forces applied to it, as explained in connection with wedge 6.

The clamping wedge 9, as will readily be understood, is manually tightened and loosened in the same manner as the wedge 6.

Endwise adjustment of the cutter blades is, of course, effected in the usual manner by loosening the clamps. When the inner walls $5^b$ of the channel 5 of the tool body are inclined to the tool axis, as shown in the drawing, instead of parallel to it, the endwise adjustment of the cutters effects simultaneously their radial adjustment, thus adapting the particular tool shown to function either as an end mill or as a boring head.

Functional or operative advantages of the cutter-clamping and adjusting means have been noted in the foregoing description. With respect to manufacture of tools embodying the invention, it has also been mentioned that the cylindrical form of the wedge blocks and of the recesses within which they fit and operate facilitate manufacture. It also has been explained that the coacting surfaces of wedge and cutter blade need not be formed with any high degree of accuracy and this obviously favors low cost of production.

This is especially important with respect to the cutter blades which wear out and must be replaced from time to time.

From the foregoing explanation of the specific form of tool illustrated, as well as the more general statements at the beginning of the description, it will be apparent that my improvements are applicable to a wide variety of tools. Also, it is to be understood that the invention is not limited to the specific forms of cutter blades and clamping devices illustrated but may be embodied in a variety of forms within the scope of the appended claims.

What I claim is:

1. In a cutting tool, the combination of a body structure formed with a channel to receive a cutter blade, said channel having a plane rear wall to engage and support the rear face of the blade, another plane wall to engage and support one side of the blade and a front wall formed with a recess; a cutter blade disposed in said channel and projecting therefrom, said blade having on its front face a series of mutually similar grooves; a wedge disposed in the said recess with engagement between its rear side and the front of the cutter blade, the rear side of the wedge being formed with a single tooth to engage the side walls of any one of a plurality of the cutter blade grooves and with a separate contact zone spaced from the said tooth laterally of the said grooves to engage the front face of the cutter blade without contacting the groove walls thereof and the wedge having a limited freedom of movement in the recess on lines transverse to its wedging movement to permit the wedge to adjust itself to the cutter blade; and a screw device for forcing the wedge into tight engagement with the cutter blade.

2. A cutting tool as claimed in claim 1 in which the channel recess of the body and the wedge have their coacting surfaces cylindrical in form and the screw device comprises a screw extending through the wedge into the body with its axis in a plane of rotation of the tool that is disposed between the wedge tooth and the other said contact zone of the wedge.

3. A cutting tool as claimed in claim 1 in which the wedge has its said contact zone limited substantially to a line in a plane extending transversely to the said tooth of the wedge.

4. A cutting tool as claimed in claim 1 in which the channel recess of the body and the wedge have their co-acting surfaces cylindrical in form and the screw device comprises a screw extending through the wedge into the body with its axis in a plane of rotation of the tool that is disposed between the wedge tooth and the other said contact zone of the wedge.

5. A cutting tool as claimed in claim 1 in which the channel recess of the body and the wedge have their co-acting surfaces cylindrical in form and the screw device comprises a screw extending through the wedge into the body with its axis in a plane of rotation of the tool that is disposed between the wedge tooth and the other said contact zone of the wedge and the latter zone is limited substantially to a line in a plane extending transversely to the said tooth of the wedge.

6. A cutting tool as claimed in claim 1 in which the wedge has its said contact zone limited substantially to a line in a plane extending transversely to the said tooth of the wedge and spaced from the inner and outer ends of the wedge.

7. A cutting tool as claimed in claim 1 in which the wedge has its said contact zone limited substantially to a line in a plane extending transversely to the said tooth of the wedge and spaced from the inner and outer ends of the wedge but nearer the outer than the inner end thereof.

8. In a cutting tool, the combination of a body structure formed with a channel to receive a cutter blade, said channel having a plane rear wall to engage and support the rear face of the blade, another plane wall to engage and support one side of the blade and a front wall formed with a recess; a cutter blade disposed in said channel and projecting therefrom, said blade having its front face and the wall of the recess opposed thereto converging toward the axis of the tool; a wedge disposed in the said recess with engagement between its front side and the said opposed wall of the recess and between its rear side and the front face of the cutter blade, the rear side of the wedge being formed with a zone for contacting the front of the blade that is limited substantially to a line in a plane extending transversely to the direction of operative movement of the wedge and spaced from the inner and outer ends of the wedge.

9. In a cutting tool, the combination of a body structure formed with a channel to receive a cutter blade, said channel having a plane rear wall to engage and support the rear face of the blade, another wall to engage and support one side of the blade and a front wall formed with a recess; a cutter blade disposed in said channel and projecting therefrom, said blade having on its front face a series of parallel grooves of uniform depth throughout their length with the plane of said series of grooves and the wall of the said recess opposed thereto converging toward the axis of the tool; a wedge disposed in the said recess with engagement between its front side and said opposed wall of the recess and between its rear side and the front of the cutter blade, the rear contacting surface of the wedge comprising a tooth to engage the sides of any one of a plurality of the cutter blade grooves when the blade is adjusted; and a screw device for forcing the wedge into tight engagement with the cutter blades.

WILLIAM L. BENNINGHOFF.